Patented Sept. 18, 1945

2,384,855

UNITED STATES PATENT OFFICE 2,384,855

CHEMICAL PROCESS AND PRODUCT

Frank J. Soday, Swarthmore, Pa., assignor to The United Gas Improvements Company, a corporation of Pennsylvania No Drawing. Application January 1, 1942,
Serial No. 425,342

17 Claims. (Cl. 106—181)

This application is a continuation-in-part of my copending applications Serial Number 246,997, filed Dec. 21, 1938 (now Patent Number 2,275,384, dated March 3, 1942; Serial Number 278,481, filed June 10, 1939 (now Patent Number 2,275,386, dated March 3, 1942); Serial Number 317,529, filed Feb. 6, 1940 (now Patent Number 2,275,383, dated March 3, 1942); and Serial Number 313,341, filed January 11, 1940 (now Patent Number 2,275,385, dated March 3, 1942).

The present invention relates to new compositions of matter and to methods for their preparation.

More particularly, this invention pertains to the use of one or more esters of methyl-$\Delta$4-tetrahydrophthalic acid, either alone or in combination with other plasticizing agents, as plasticizing agents for resins and plastics, particularly cellulosic plastics.

It is an object of the present invention to provide new compositions of matter comprising mixtures of one or more esters of methyl-$\Delta$4-tetrahydrophthalic acid with one or more resins or plastics, particularly cellulosic plastics. Another object of the invention is the provision of organic compounds comprising fluids which are essentially colorless and odorless and which are suitable for use alone or in combination with other substances as plasticizers in the formation of lacquers derived from one or more cellulosic plastics. A further object of the invention is the provision of new molding compositions comprising one or more esters of methyl-$\Delta$4-tetrahydrophthalic acid in combination with one or more resins or plastics, particularly cellulosic plastics. Other objects and advantages of the invention will be apparent to those skilled in the art from the following description.

Esters of methyl-$\Delta$4-tetrahydrophthalic acid may be regarded as being derived from an acid having the following structural formula

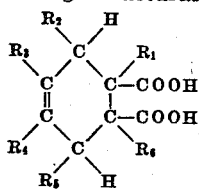

in which one of the group consisting of $R_1$, $R_2$, $R_3$, $R_4$, $R_5$, and $R_6$ is a methyl group, the remainder being hydrogen atoms.

Ester of this acid may be represented as follows

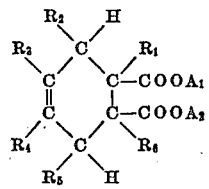

in which one of the group consisting of $R_1$, $R_2$, $R_3$, $R_4$, $R_5$, and $R_6$ is a methyl group, the remainder being hydrogen atoms; $A_1$ represents one of a group consisting of alkyl, substituted alkyl, aryl, substituted aryl, alkyl-aryl, substituted alkyl-aryl, aryl-alkyl, and substituted aryl-alkyl group, and $A_2$ represents one of a group consisting of hydrogen, alkyl, substituted alkyl, aryl, substituted aryl, alkyl-aryl, substituted alkyl-aryl, aryl-alkyl, and substituted aryl-alkyl groups.

The acids or anhydrides from which these esters may be assumed to be derived may be prepared in any desired manner. Thus, a convenient method for the preparation of 4-methyl-$\Delta$4-tetrahydrophthalic anhydride involves the reaction of isoprene with maleic anhydride. This reaction may be illustrated structurally as follows.

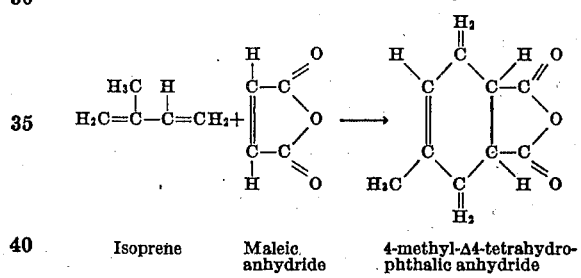

| Isoprene | Maleic anhydride | 4-methyl-$\Delta$4-tetrahydrophthalic anhydride |

The anhydride may be readily hydrolyzed to form the corresponding acid, 4-methyl-$\Delta$4-tetrahydrophthalic acid, for instance, by mixture with water.

Illustrative of the reaction by which 4-methyl-$\Delta$4-tetrahydrophthalic anhydride may be prepared is the example given below as Example A.

Isoprene, or hydrocarbon fractions containing any portion of isoprene may be used to react with maleic anhydride. The isoprene may be obtained synthetically, by the pyrolysis of rubber, or from fractions obtained by condensation in the manufacture of carburetted water gas, oil gas, refinery gas, or coke oven gas, or from similar sources. Such fractions will be referred to herein generally as light oil fractions.

For example, a sample of light oil obtained in the manufacture of oil gas under certain conditions, may be fractionated to obtain a cut containing say from 30 to 90% isoprene, in addition to various quantities of other unsaturated hydrocarbons. Cyclopentadiene and perhaps similar unsaturated hydrocarbons which may be present in an isoprene fraction may, if desired, be removed among other ways by heating the material, say at 100° C., in a closed vessel for several hours, followed by the distillation of the unchanged isoprene from the polymers thus formed. Piperylene may also be present. While a concentration of isoprene of at least 30% is preferred, lower concentrations may be employed.

The isoprene or isoprene fraction may be reacted with maleic anhydride or maleic acid or mixtures of these to produce 4-methyl-Δ4-tetrahydrophthalic anhydride by warming a mixture of the reagents. The reactants may be mixed say in substantially molar quantities and allowed to react at room temperatures or at elevated temperatures until substantially complete conversion has been obtained.

A preferred embodiment of effecting the reaction is to mix the reactants and allow the mixture to stand at room temperature for a period of time, followed by heating to a temperature of approximately 60° C. for a relatively short period of time.

However, the process is not restricted to the use of any definite heating time or temperature.

The reactants may be combined as such, or in solution form in a suitable solvent or solvents. Suitable solvents for this purpose include aromatic hydrocarbons, chlorinated solvents, esters, ethers, and the like.

4-methyl-Δ4-tetrahydrophthalic anhydride is obtained in good yields as a result of this reaction. The anhydride may be readily hydrolyzed to 4-methyl-Δ4-tetrahydrophthalic acid if desired as above pointed out.

Illustrative of one of the methods of preparation of 4-methyl-Δ4-tetrahydrophthalic anhydride is the following example:

*Example A*

A portion of an isoprene cut obtained by the fractionation of light oil, and containing 90 parts by weight of isoprene was mixed with 100 parts of maleic anhydride. This mixture was then dissolved in 260 parts of benzene, placed in an autoclave and allowed to stand for approximately 45 hours at room temperature. It was then heated at 60° C. for a period of 6 hours with agitation. At the end of this period it was cooled to 0° C. and filtered. There was obtained a mass of crystals corresponding to approximately 105 parts by weight. A further quantity of crystals, amounting to approximately 45 parts by weight was obtained by recrystallization from the filtrate. These crystals, totalling approximately 150 parts by weight, were found to be a highly purified form of 4-methyl-Δ4-tetrahydrophthalic anhydride.

In a similar manner, 3-methyl-Δ4-tetrahydrophthalic anhydride may be prepared by the reaction of piperylene with maleic anhydride.

This reaction may be illustrated structurally as follows:

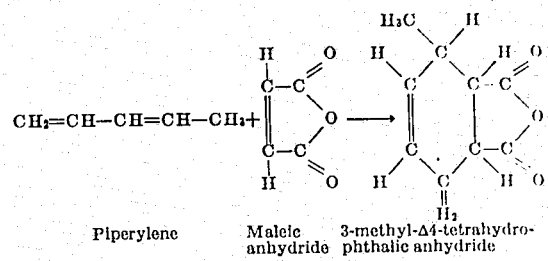

Piperylene　　Maleic　　3-methyl-Δ4-tetrahydro-
　　　　　　　anhydride　phthalic anhydride

The anhydride also may be readily hydrolyzed to form the corresponding acid, 3-methyl-Δ4-tetrahydrophthalic acid, for instance, by mixture with water.

Illustrative of the reaction by which 3-methyl-Δ4-tetrahydrophthalic anhydride may be prepared is the example given below as Example B.

Piperylene, or hydrocarbon fractions containing any portion of piperylene may be used to react with maleic anhydride. The piperylene may be obtained synthetically, or from fractions obtained by condensation in the manufacture of carburetted water gas, oil gas, refinery gas, or coke oven gas, or from similar sources. Such fractions will be referred to herein gradually as "light oil fractions."

For example, a sample of light oil, obtained in the manufacture of oil gas, under certain conditions, may be fractionated to obtain a cut containing, say from 30 to 90% piperylene, in addition to various other quantities of other unsaturated hydrocarbons. Cyclopentadiene and perhaps similar unsaturated hydrocarbons which may be present in a piperylene fraction may, if desired, be removed among other ways by heating the material, say at 100° C., in a closed vessel for several hours, followed by the distillation of the unchanged piperylene from the polymers thus formed. Isoprene may also be present. While a concentration of piperylene of at least 30% is preferred, lower concentrations may be employed.

The piperylene or piperylene fraction may be reacted with maleic anhydride or maleic acid or mixtures of these to produce 3-methyl-Δ4-tetrahydrophthalic anhydride by warming a mixture of the reagents. The reactants may be mixed, say in substantially molal quantities, and allowed to react at room temperatures or at elevated temperatures until substantially complete conversion has been obtained.

One preferred method for bringing about the reaction is by mixing the reactants and allowing the mixture to stand at room temperature, or lower, for a period of time.

However, the process is not restricted to the use of any definite heating time or temperature.

The reactants may be combined as such, or in solution form in a suitable solvent or solvents. Suitable solvents for this purpose include aromatic hydrocarbons, chlorinated solvents, esters, ethers, and the like. 3-methyl-Δ4-tetrahydrophthalic anhydride is obtained in good yield as a result of this reaction. The anhydride may be readily hydrolyzed to 3-methyl-Δ4-tetrahydrophthalic acid, if desired, as pointed out previously.

Illustrative of one of the methods for preparing 3-methyl-Δ4-tetrahydrophthalic anhydride is the following example:

*Example B*

An enameled vessel of about five gallons capacity was equipped with a stirrer, safety valve and manometer. A mixture of 1475 grams (15.06 mols) of maleic anhydride and 1589 grams (2270 cc.) of a piperylene cut containing 83.7% piperylene by weight (19.6 mols of piperylene) was placed in the vessel together with one liter of acetone. The temperature was reduced to 0° C. and the mixture stirred for a period of one hour, whereupon an exothermic reaction occurred.

The mixture was maintained at a temperature of 0° C. for an additional period of 48 hours, after which the solution was decanted from the crystalline 3-methyl-Δ4-tetrahydrophthalic anhydride.

The crystals obtained amounted to 1673 grams, after washing with petroleum ether and drying.

The reaction mixture was then chilled to a temperature of −40° C., whereupon an additional quantity of 3-methyl-Δ4-tetrahydrophthalic anhydride, amounting to 570 grams, was obtained.

The total yield of crystals secured as the result of these operations was 90% of the theoretical yield, based on the maleic anhydride used. This yield was increased to approximately 100% of the theoretical yield by evaporation of the residual liquid, whereupon the small quantity of piperylene which did not enter into the reaction was recovered.

Ester formation

Through the reaction of acids or anhydrides of the type described with alcohols or derivatives thereof, there may be produced esters having properties which make them valuable as plasticizing agents for a wide variety of resins and plastics.

Among the alcohols which may be reacted with acids of the type described are the following: methyl alcohol, ethyl alcohol, normal propyl alcohol, secondary propyl alcohol, normal butyl alcohol, secondary butyl alcohol, isobutyl alcohol, tertiary butyl alcohol, normal amyl alcohol, secondary butyl carbinol, isoamyl alcohol, neopentyl alcohol, pentanol-2, pentanol-3, methyl isopropyl carbinol, tertiary amyl alcohol, the hexyl alcohols, the heptyl alcohols, the octyl alcohols, alcohols having a higher number of carbon atoms, derivatives and substituents of the foregoing alcohols, as well as mixtures of alcohols containing either one or more of the foregoing alcohols, or two or more such alcohols of the same number of carbon atoms where isomeric forms exist.

Esters of the type described may be made in different ways.

One convenient way for the preparation of such esters is to react the desired acid or its anhydride, or mixture thereof, with the desired alcohol, or substituent thereof, by heating the reacting constituents to the boiling point of the alcohol while employing a reflux condenser to return the vaporized alcohol to the still.

The reaction of the alcohol and the acid or anhydride results in the production of water. It is advisable to remove the water from the reaction, which may be done in a number of ways.

For example, the mixed reactants may be heated to boiling, the vapors condensed, and the condensate stratified by various methods. The alcohol layer may be returned to the still and the water layer discarded or further processed to reclaim the small quantities of alcohol and ester which it may contain.

The continuous removal of the water formed during the reaction results in a considerable increase in the velocity of the esterification reaction and an increase in the yield of ester obtained from the process.

The removal of water formed during the reaction may be facilitated by the addition of a third component. A procedure which has been found very satisfactory is the following: a compound capable of forming an azeotropic mixture with water, and at the same time being sparingly soluble in water at room temperature, is added to the mixture of the alcohol and acid, or anhydride, and the ternary system so formed is heated to the boiling point. Benzene is suitable for use as such a compound. The vapors formed are condensed and permitted to stratify. The alcohol layer, namely, the upper layer, is returned to the still and the water layer is discarded, or subsequently processed to reclaim the small quantities of alcohol and ester which it may contain. This procedure may be employed in batch or continuous or continual operations, or otherwise.

Another way to prepare the desired esters involves the use of a catalyst which will facilitate the reaction between the alcohol and the acid. Among the catalysts which may be employed for this purpose are sulfuric acid and anhydrous hydrogen chloride. When the latter is used, the mixture of alcohol and acid may be saturated with the dry hydrogen chloride, if desired.

Esters of the type described also may be prepared through the reaction of the acid chloride or other acid halide of the desired acid with the desired alcohol.

When this procedure is employed, it has been found that the use of another component capable of reacting to remove the liberated hydrogen chloride, or other hydrogen halide, facilitates the preparation of the ester. Compounds which will act in this capacity without interfering with the main reaction are the amines, such as aniline, dimethyl aniline, methylamine, ethylamine, and ethanolamine, as well as organic bases in general, such as for example, tetramethyl ammonium hydroxide.

In place of the alcohol, there may be used its metallic derivative such as the corresponding sodium, potassium, or lithium alcoholate.

Generally speaking, in the process described herein, the reactants may be combined in any desired proportion, the excess of either component being separated from the reaction mass at the conclusion of the reaction by distillation or other suitable means, if desired.

The reactants may be mixed at the start of the reaction, or one of the components may be added to the other component during the course of the reaction. The reaction may be carried out batchwise, semi-continuously, continuously, continually, or otherwise and the reactants may be combined in a concurrent or countercurrent manner, or otherwise.

The use of at least approximately two mols of alcohol to one mol of the acid or the anhydride will be found to be advantageous from the standpoint of reaction speed and yield of ester.

If an acidic catalyst, such as sulfuric acid, has been employed, any acidity of the resultant product may be neutralized with sodium carbonate prior to the separation of the ester, such as by vacuum distillation. In most cases, however, this neutralization step will be found to be unnecessary.

When mixtures containing one or more alcohols are used for the preparation of esters of the type described, the mixture of esters so formed can be used as such, or they can be separated into their individual components by fractionation or by other suitable means.

In a similar manner, mixtures of two or more methyl-Δ4-tetrahydrophthalic acids, such as, for example, the mixture of 3-methyl-Δ4-tetrahydrophthalic acid and 4-methyl-Δ4-tetrahydrophthalic acid resulting from the reaction of a light oil isoprene-piperylene fraction with maleic anhydride, may be reacted with one or more alcohols to give a mixture of esters. Such mixed esters may be used as plasticizing agents, or they may be separated by suitable means.

Among other methods, vacuum distillation may be utilized to isolate the pure individual esters from the mixture of alkyl esters.

Illustrative of the preparation of esters of the type described by the foregoing methods are the following examples.

*Example 1*

To a mixture of 83 parts by weight of 3-methyl-Δ4-tetrahydrophthalic anhydride, 80 parts by weight of methyl alcohol and 22 parts by weight of benzene, was added approximately 5 parts by weight of anhydrous hydrogen chloride. This mixture was refluxed for a period of approximately 24 hours. Following the refluxing period, the benezene and alcohol were removed by distillation and the residual liquid was fractionated in vacuo. There was thus obtained the dinormal methyl ester of 3-methyl-Δ4-tetrahydrophthalic acid in quantity equivalent to 86 parts by weight, representing 81% of the theoretical yield.

This ester had the following physical properties:

Boiling point 124–134° C. at 4 mm.
Density D 20/4=1.1196
Refractive index N 20/D=1.4720

*Example 2*

To a mixture of 83 parts by weight of 3-methyl-Δ4-tetrahydrophthalic anhydride, 185 parts by weight of normal butyl alcohol, and 55 parts by weight of benzene, was added approximately 2 parts by weight of 95% sulfuric acid. This mixture was refluxed for a period of approximately 44 hours. The water generated during the reaction was continuously removed by collecting the condensate in a trap, separating the layers, and returning the water-free reaction products to the reaction flask. A quantity equivalent to 11 parts by weight of water was removed during the course of the reaction. Following the refluxing period, the benzene and alcohol were removed by distillation and the residual liquid was fractionated in vacuo. There was thus obtained a di-normal butyl ester of 3-methyl-Δ4-tetrahydrophthalic acid in quantity equivalent to 136 parts by weight, representing 92% of the theoretical yield.

This ester had the following physical properties:

Boiling point—164–170° C. at 3 mm.
Density D 20/4=1.0102
Refractive index N 20/D=1.4635

*Example 3*

A mixture comprising 83 parts by weight of 4-methyl-Δ4-tetrahydrophthalic anhydride, 115 parts of ethyl alcohol, 27 parts of benzene, and 2.5 grams of 96% sulfuric acid was refluxed for a period of 25 hours.

Water was removed from the condensate by the method described in Example 2 continuously during the reaction.

After the refluxing had been discontinued, the benzene and unreacted alcohol were removed by distillation and the residue fractionated in vacuo.

There were obtained a 76% yield of the diethyl ester of 4-methyl-Δ4-tetrahydrophthalic acid. This ester had the following properties:

Boiling range—135–140° C. at 5 mm.
Density D 20/4=1.0816
Refractive index ($n$ 20/$d$=1.4680

*Example 4*

A mixture of 131 grams (0.8 mol) of 3-methyl-Δ4-tetrahydrophthalic anhydride, 366 grams (4.0 mols) of secondary butyl alcohol, and 73 cc. of benzene was refluxed at a temperature of 145–155° C. for a period of 31 hours, a continuous stream of dry hydrogen chloride being passed into the solution during this period.

The crude reaction produced was washed with water, then with 100 cc. of a 10% sodium carbonate solution, and again with water, after which it was dried and fractionated in vacuo. A total of 156 grams of the di-secondary butyl ester of 3-methyl-Δ4-tetrahydrophthalic acid was obtained, having the following physical properties:

Boiling range—140–160° C. at 2 mm.
Density ($d$ 20/4) =1.0178
Refractive index ($n$ 20/D) =1.463

*Example 5*

To a mixture of 83 parts by weight of 4-methyl-Δ4-tetrahydrophthalic anhydride and 220 parts by weight of normal amyl alcohol dissolved in benzene was added approximately 2½ parts by weight of 95% sulfuric acid. This mixture was refluxed at a temperature of between 135 and 145° C. for a period of approximately 46 hours. The water generated during the reaction was continuously removed by collecting the condensate in a trap, separating the layers, and returning the water-free reaction products to the reaction flask. A quantity equivalent to 18 parts by weight of water was removed during the course of the reaction. Following the extended refluxing period, the benzene and alcohol were removed by distillation and the residual liquid was fractionated in vacuo. There was thus obtained a di-normal amyl ester of 4-methyl-Δ4-tetrahydrophthalic acid in quantity equivalent to 135 parts by weight, representing 83% of the theoretical yield.

This ester had the following physical properties:

Boiling point—176–190° C. at 3 mm.
Density D 20/4=0.9882
Refractive index N 20/$d$=1.4641

The ethyl or propyl esters of 3-methyl-Δ4-tetrahydrophthalic acid may be prepared starting from the corresponding ethyl or propyl alcohols by methods generally similar to those already described.

Any of the methods described herein may be employed in the preparation of esters of the type described. However, certain of the described procedures give somewhat better yields of esters than others, depending, among other things, upon the type of alcohol employed in the reaction.

For example, the reaction of tertiary butyl alcohol or tertiary amyl alcohol with 3-methyl-Δ4-tetrahydrophthalic acid can be effected by refluxing the reactants without the presence of any catalyst; the reaction, however, is somewhat slow and incomplete, and may be greatly accelerated by the addition of a catalyst. Sulfuric acid or hydrogen chloride may be added to assist in the removal of water formed by the reaction, and zinc dust may be added to catalyze the combination of the reactants.

A preferred method is the reaction of a metallic salt of the desired acid, such as the sodium salt, with a tertiary alkyl halide or derivative, such as tertiary butyl chloride, or tertiary amyl chloride, suitably at elevated temperatures and pressures.

Similarly, the reaction of secondary butyl alcohol, for example, with 4-methyl-Δ4-tetrahydrophthalic acid may be accelerated through the use of a suitable catalyst, such as gaseous hydrogen chloride.

The production of secondary esters without the use of a catalyst is much slower than the production of the corresponding primary esters in the absence of a catalyst.

In addition, a certain amount of rearrangement will be observed in the reaction of certain of the secondary alcohols with acids, or anhydrides, of the type described. Thus, for example, when secondary butyl carbinol, or derivative thereof, is employed in the reaction, some tertiary and primary esters usually will be obtained in the product.

The esters of methyl-Δ4-tetrahydrophthalic acid are, in general, practically colorless and odorless fluids.

As pointed out previously, these esters are excellent plasticizers for cellulose acetate, cellulose nitrate, ethyl cellulose, natural gums, synthetic resins, such as polystyrene and polymethylstyrene, and resinous and plastic materials in general.

They may be applied, either alone or in combinations with other plasticizers, in the formulation of plastics and lacquers in general, particularly those lacquers containing cellulose esters and ethers. They are particularly valuable as plasticizers for lacquer films. They may be used as plasticizers and softening agents for resins, plastics, and gums which are to be molded, extruded, cast or formed by any of the methods known to the art.

Exemplary of their industrial utility is their use as lacquer plasticizing agents. For this purpose, it is sometimes desirable to employ substances possessing a fairly wide range of plasticizing characteristics. Mixed esters of methyl-Δ4-tetrahydrophthalic acid such as are obtained by the reaction of mixtures of say, ethyl and butyl alcohols with the desired acid or anhydride, or mixture thereof, are particularly adapted to meet the requirements for such plasticizing agents. The use of these various esters in combination with other esters, such as those derived from maleic acid or phthalic acid, also will be found to be desirable in certain cases.

On the other hand, it is often desirable to make use of substances having a fairly narrow boiling range. Butyl esters of methyl-Δ4-tetrahydrophthalic acid or its anhydride, which have been prepared through the reaction of a single butyl alcohol with the acid or anhydride, meet the requirements for such a substance. The same is true with respect to single ethyl esters, single propyl esters, single butyl esters, and single amyl esters, using a single ethyl, propyl, butyl, or amyl alcohol.

In certain cases, the use of mixtures comprising certain, or all, of the ethyl, propyl, butyl, amyl, or other, esters of methyl-Δ4-tetrahydrophthalic acid, or mixtures containing one or more of such esters in combination with one or more esters or derivatives of other acids, such as for example, maleic or phthalic acid, will be found to be desirable.

The use of alkyl esters of methyl-Δ4-tetrahydrophthalic acid as plasticizing agents is illustrated by the following examples:

*Example 6*

A mixture of the following basic ingredients:

| | Parts |
|---|---|
| Ester gum | 2.5 |
| Nitrocellulose (½ second) | 5 |
| Dimethyl ester of 3-methyl-Δ4-tetrahydrophthalic acid | 2.5 | was incorporated in 40 parts of a thinner of the following composition:

| | Parts |
|---|---|
| Amyl alcohol | 10 |
| Isopropyl acetate | 13 |
| Anhydrous ethyl alcohol | 3 |
| Toluol | 34 |
| Troluol | 20 |
| Pentacetate | 20 |

A clear, somewhat viscous solution was obtained. This lacquer was applied to the surface of tin panels and permitted to dry overnight. An adherent, extensible, flexible film was formed which did not crack when the tin panel was repeatedly bent through an angle of 180°.

*Example 7*

A mixture of the following basic ingredients:

| | Parts |
|---|---|
| Cellulose acetate | 6.5 |
| Methyl ester of 4-methyl-Δ4-tetrahydrophthalic acid | 0.5 | was dissolved in 93 parts of a thinner of the following composition:

| | Parts |
|---|---|
| Acetone | 50 |
| Ethylene glycol monomethyl ether | 20 |
| Toluene | 15 |
| Isoprene acetate | 15 |

A clear, somewhat viscous solution was obtained. This was used to coat several metal panels which were subsequently permitted to dry overnight. An adherent, extensible film was formed. It did not crack when the panel was repeatedly bent over a ⅛" mandrel through an angle of 180°.

*Example 8*

Approximately 5 parts of ester gum, 10 parts of ethyl cellulose, and 5 parts of the ethyl ester of 3-methyl-Δ4-tetrahydrophthalic acid was dissolved in 80 parts of a thinner having the following composition:

| | Parts |
|---|---|
| Pentasol | 10 |
| Pentacetate | 20 |
| Isopropyl acetate | 13 |
| Ethyl alcohol (anhydrous) | 3 |
| Toluol | 34 |
| Troluol | 20 |

A clear, viscous solution was obtained, which was subsequently applied to the surface of tin panels. A tough, adherent, extensible film was obtained.

Example 9

A mixture of the following basic ingredients:

| | Parts |
|---|---|
| Ester gum | 2.5 |
| Nitrocellulose (½ second) | 5 |
| 4 methyl-Δ4-tetrahydrophthalic acid ethyl ester | 2.5 | was incorporated in 40 parts of a thinner of the following composition:

| | Parts |
|---|---|
| Amyl alcohol | 10 |
| Isopropyl acetate | 13 |
| Anhydrous ethyl alcohol | 3 |
| Toluol | 34 |
| Troluol | 20 |
| Pentacetate | 20 |

A clear, somewhat viscous solution was obtained. This lacquer was applied to the surface of tin panels and permitted to dry overnight. An adherent extensible, flexible film was found, which did not crack when the tin panel was repeatedly bent through an angle of 180°.

Example 10

A mixture of the following basic ingredients:

| | Parts |
|---|---|
| Cellulose acetate | 6.5 |
| 3-methyl-Δ4-tetrahydrophthalic acid propyl ester | 0.5 | was dissolved in 93 parts of a thinner of the following composition:

| | Parts |
|---|---|
| Acetone | 50 |
| Ethylene glycol monomethyl ether | 20 |
| Toluene | 15 |
| Isoprene acetate | 15 |

A clear, somewhat viscous solution was obtained. This was used to coat several metal panels which were subsequently permitted to dry overnight. An adherent, extensible film was formed. It did not crack when the panel was repeatedly bent over a ⅛" mandrel through an angle of 180°.

Example 11

Approximately 5 parts of ester gum, 10 parts of ethyl cellulose, and 5 parts of the propyl ester of 4-methyl-Δ4-tetrahydrophthalic acid was dissolved in 80 parts of a thinner having the following composition:

| | Parts |
|---|---|
| Pentasol | 10 |
| Pentacetate | 20 |
| Isopropyl acetate | 13 |
| Ethyl alcohol (anhydrous) | 3 |
| Toluol | 34 |
| Troluol | 20 |

A clear, viscous solution was obtained, which was subsequently applied to the surface of tin panels. A tough, adherent, extensible film was obtained.

Example 12

A mixture of the following basic ingredients:

| | Parts |
|---|---|
| Ester gum | 2.5 |
| Nitrocellulose (½ second) | 5 |
| 3-methyl-Δ4-tetrahydrophthalic acid butyl ester | 2.5 | was incorporated in 40 parts of a thinner of the following composition:

| | Parts |
|---|---|
| Amyl alcohol | 10 |
| Isopropyl acetate | 13 |
| Anhydrous ethyl alcohol | 3 |
| Toluol | 34 |
| Troluol | 20 |
| Pentacetate | 20 |

A clear, somewhat viscous solution was obtained. This lacquer was applied to the surface of tin panels and permitted to dry overnight. An adherent extensible, flexible film was found, which did not silk or crack when the tin panel was repeatedly bent through an angle of 180°.

Example 13

A mixture of the following basic ingredients:

| | Parts |
|---|---|
| Cellulose acetate | 6.5 |
| 3-methyl-Δ4-tetrahydrophthalic acid N-amyl ester | 0.5 | was dissolved in 93 parts of a thinner of the following composition:

| | Parts |
|---|---|
| Acetone | 50 |
| Ethylene glycol monomethyl ether | 20 |
| Toluene | 15 |
| Isoprene acetate | 15 |

A clear, somewhat viscous solution was obtained. This was used to coat several metal panels which were subsequently permitted to dry overnight. An adherent, extensible film was formed. It did not crack when the panel was repeatedly bent over a ⅛" mandrel through an angle of 180°.

Example 14

Approximately 5 parts of ester gum, 10 parts of ethyl cellulose, and 5 parts of the amyl ester of 4-methyl-Δ4-tetrahydrophthalic acid was dissolved in 80 parts of a thinner having the following composition:

| | Parts |
|---|---|
| Pentasol | 10 |
| Pentacetate | 20 |
| Isopropyl acetate | 13 |
| Ethyl alcohol (anhydrous) | 3 |
| Toluol | 34 |
| Troluol | 20 |

A clear, viscous solution was obtained, which was subsequently applied to the surface of tin panels. A tough, adherent, extensible, film was obtained.

Example 15

A mixture of

| | Parts |
|---|---|
| Cellulose acetate | 6.5 |
| Ethylene glycol monomethyl ether ester of 3-methyl-Δ4-tetrahydrophthalic acid | 0.5 | was dissolved in 93 parts of the thinner employed in Example 13. A clear, viscous solution was obtained. Upon coating metal panels in the usual manner, an adherent, extensible coating film was obtained.

Example 16

This was a repetition of Example 15, with the exception that the diethylene glycol monoethyl ether ester of 3-methyl-Δ4-tetrahydrophthalic acid was employed. Identical results were obtained.

Example 17

A mixture of

| | Parts |
|---|---|
| Ester gum | 2.5 |
| Nitrocellulose (½ second) | 5 |
| Ethylene glycol monomethyl ether ester of 3-methyl-Δ4-tetrahydrophthalic acid | 1.5 | was dissolved in 41 parts of the thinner employed in Example 9. Upon applying the lacquer obtained to a metallic surface, an adherent, extensible coating film was obtained.

Example 18

This was similar to Example 17, with the exception that the diethylene glycol monoethyl ether ester of 3-methyl-Δ4-tetrahydrophthalic acid was employed as the plasticizing agent. Similar results were obtained.

Example 19

A mixture of

| | Parts |
|---|---|
| Ester gum | 5 |
| Ethyl cellulose | 5 |
| Ethylene glycol monomethyl ether ester of 3-methyl-Δ4-tetrahydrophthalic acid | 5 | was dissolved in 80 parts of the thinner employed in Example 8.

The lacquer obtained was applied to a metallic surface, whereupon a clear, adherent, extensible coating film was formed thereon.

Example 20

This was similar to Example 19, with the exception that the diethylene glycol monoethyl ether ester of 3-methyl-Δ4-tetrahydrophthalic acid was employed as the plasticizing agent. Similar results were obtained.

Example 21

A mixture of 5 parts of the diethyl ester of 3-methyl-Δ4-tetrahydrophthalic acid and 95 parts of monomeric styrene was placed in a cylindrical vessel containing an aluminum rod ¼" in diameter. The mixture was heated for a period of 72 hours at a temperature of 120° C., then for 48 hours at 140° C., and finally for 16 hours at 65° C. Upon stripping the mold from the product, a crystal-clear polystyrene casting containing the aluminum rod as an insert was obtained. After a storage period of 8 weeks, no undesirable surface conditions or defects, such as crazing, blushing, checking, or cracking were noted.

Example 22

This was similar to Example 21, with the exception that a mixture of 67 parts of m-methyl styrene, 27 parts of p-methyl styrene, and 6 parts of o-methyl styrene was employed in place of styrene. Similar results were obtained.

Example 23

A mixture of, say, 6 parts of the diethyl ester of 4-methyl-Δ4-tetrahydrophthalic acid and 94 parts of polystyrene may be molded at a temperature of, say, 150° C. and a pressure of, say, 2000 pounds per square inch to give a molded object possessing very desirable properties.

Polymethylstyrene may be substituted for polystyrene.

Example 24

A mixture of, say, 30 parts of the diethyl ester of 4-methyl-Δ4-tetrahydrophthalic acid and 70 parts of cellulose acetate may be molded in the usual manner to give a molded object possessing good properties.

Plastics, resins, and resinous masses in general may be plasticized by the use of esters of methyl-Δ4-tetrahydrophthalic acid, either alone or in admixture with other plasticizing agents or solvents. Illustrative of such resins and plastics are the following: (1) cellulose acetate, cellulose nitrate, benzyl cellulose, ethyl cellulose, cellulose acetobutyrate, cellulose actopropionate; (2) polyvinyl chloride, polyvinyl acetate, polyvinyl chloride-polyvinyl acetate co-polymers, polyvinyl esters, polyvinyl acetal; (3) polymerized acrylic acid, acrylic acid esters, acrylic nitrile; (4) polymerized methacrylic acid, methacrylic acid esters, methacrylic nitrile; (5) hydrocarbon resins, polystyrene, polymethylstyrene, polymerized vinylidene chloride, and other vinylidene derivatives; (6) polyamide-polybasic acid plastic masses, and the like. Co-polymers obtained by the polymerization of two or more of the foregoing compounds also may be plasticized by the use of esters of methyl-Δ4-tetrahydrophthalic acid.

It is to be understood, of course, that varying quantities of plasticizing agents may be employed, the quantity used, in general, depending largely upon the result desired. Thus the use of relatively large quantities of plasticizing agent will increase the flexibility and extensibility of a given resin or plastic substantially, while at the same time reducing its softening point somewhat. By varying the relative quantity and type of methyl-Δ4-tetrahydrophthalic acid ester, or mixture thereof, employed, almost any desired effect may be achieved.

Other ingredients, such as pigments, coloring agents, fillers, mold lubricants, solvents, and the like, also may be incorporated in resins or plastic compositions containing one or more esters of methyl-Δ4-tetrahydrophthalic acid.

For certain uses, such as for lacquer plasticizing agents, it has been found advantageous in certain cases to use a mixture of the ester with a small quantity of the corresponding alcohol in order to neutralize any acidity which may be formed as the result of a slight hydrolysis of the ester.

While the use of specific esters of methyl-Δ4-tetrahydrophthalic anhydride as plasticizing agents have been particularly described, it is to be understood that this is by way of illustration. Therefore, changes, omissions, additions, substitutions, and/or modifications may be made within the scope of the claims without departing from the spirit of the invention.

I claim:

1. As a new composition of matter, an ester having the following formula:

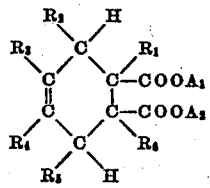

in which one of the group consisting of $R_1$, $R_2$, $R_3$, $R_4$, $R_5$ and $R_6$ is a methyl group, the remainder being hydrogen atoms; $A_1$ represents one of a group consisting of alkyl, substituted alkyl, aryl, substituted aryl, alkyl-aryl, substituted alkyl-aryl, aryl-alkyl, and substituted aryl-alkyl groups; and $A_2$ represents one of a group consisting of hydrogen, alkyl, substituted alkyl, aryl, substituted aryl, alkyl-aryl, substituted alkyl-aryl, aryl-alkyl, and substituted aryl-alkyl groups; and at least one of a group consisting of cellulosic ethers, cellulosic esters, natural resins, and synthetic resins.

2. As a new composition of matter, an ester of methyl-Δ4-tetrahydrophthalic acid and one of a group consisting of cellulosic ethers, cellulosic esters, natural resins, and synthetic resins.

3. As a new composition of matter, an ester of 4-methyl-Δ4-tetrahydrophthalic acid and one of a group consisting of cellulosic ethers, cellulosic esters, natural resins, and synthetic resins.

4. As a new composition of matter, an ester of 3-methyl-Δ4-tetrahydrophthalic acid and one of a group consisting of cellulosic ethers, cellulosic esters, natural resins, and synthetic resins.

5. As a new composition of matter, an alkyl ester of methyl-Δ4-tetrahydrophthalic acid and one of a group consisting of cellulosic esters, cellulosic ethers, natural resins, and synthetic resins.

6. As a new composition of matter, an alkyl ester of 4-methyl-Δ4-tetrahydrophthalic acid and one of a group consisting of cellulosic ethers, cellulosic esters, natural resins, and synthetic resins.

7. As a new composition of matter, an alkyl ester of 3-methyl-Δ4-tetrahydrophthalic acid and one of a group consisting of cellulosic ethers, cellulosic esters, natural resins, and synthetic resins.

8. As a new composition of matter, the dibutyl ester of 4-methyl-Δ4-tetrahydrophthalic acid and one of a group consisting of cellulosic ethers, cellulosic esters, natural resins, and synthetic resins.

9. As a new composition of matter, the diamyl ester of 4-methyl-Δ4-tetrahydrophthalic acid and one of a group consisting of cellulosic ethers, cellulosic esters, natural resins, and synthetic resins.

10. As a new composition of matter, the dibutyl ester of 3-methyl-Δ4-tetrahydrophthalic acid and one of a group consisting of cellulosic ethers, cellulosic esters, natural resins, and synthetic resins.

11. A lacquer comprising an alkyl ester of methyl-Δ4-tetrahydrophthalic acid, a cellulose ester, and a solvent.

12. A lacquer comprising an alkyl ester of methyl-Δ4-tetrahydrophthalic acid, a cellulose ether, and a solvent.

13. A lacquer comprising an alkyl ester of methyl-Δ4-tetrahydrophthalic acid, cellulose nitrate, and a solvent.

14. A lacquer comprising an alkyl ester of methyl-Δ4-tetrahydrophthalic acid, ethyl cellulose, and a solvent.

15. As a new composition of matter, an ester of methyl-Δ4-tetrahydrophthalic acid and a synthetic resin.

16. A lacquer comprising an ester of methyl-Δ4-tetrahydrophthalic acid, one of a group consisting of cellulosic ethers, cellulosic esters, natural resins, and synthetic resins, and a solvent.

17. A molding composition comprising an ester of methyl-Δ4-tetrahydrophthalic acid, one of a group consisting of cellulosic ethers, cellulosic esters, natural resins, and synthetic resins, and at least one of a group consisting of pigment, coloring agent, and filler.

FRANK J. SODAY.